H. W. DYER.
AUTOMOBILE FENDER.
APPLICATION FILED FEB. 7, 1916.
1,406,828.
Patented Feb. 14, 1922.
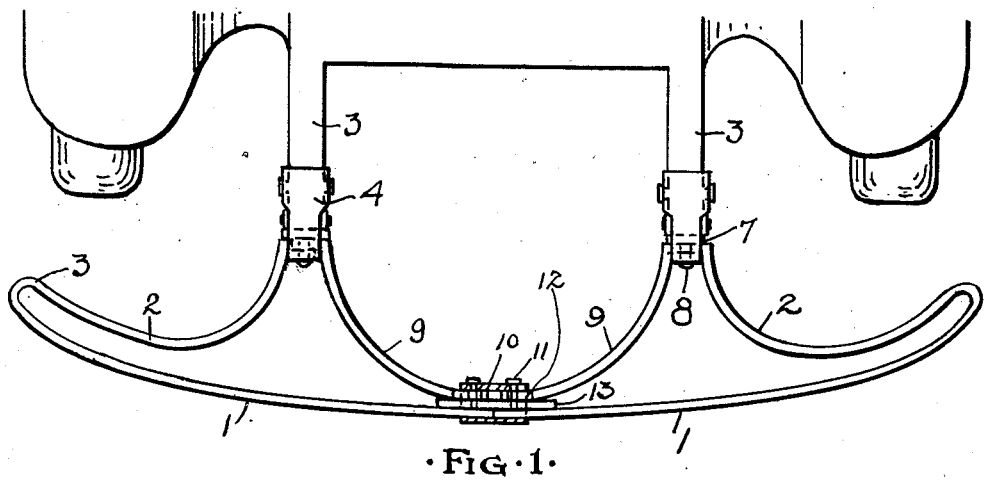
FIG. 1.
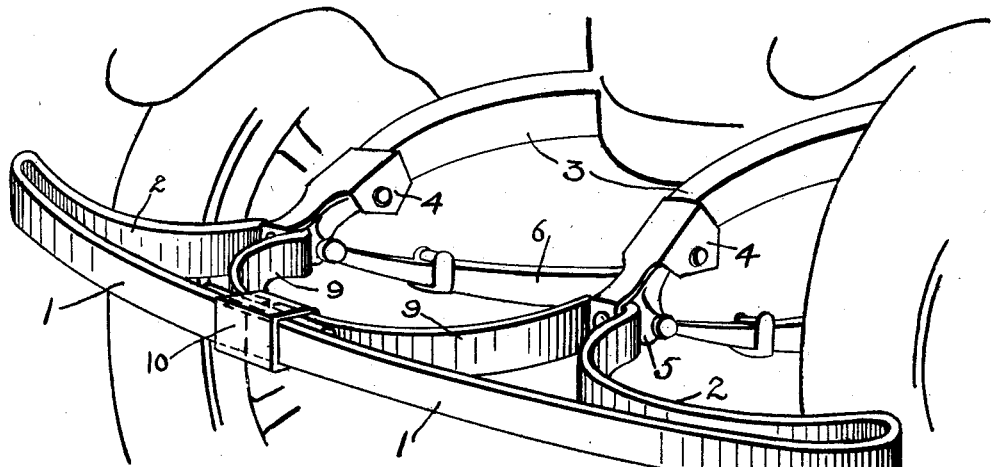
FIG. 2.
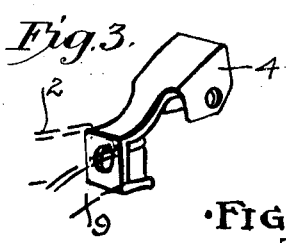
Fig. 3.
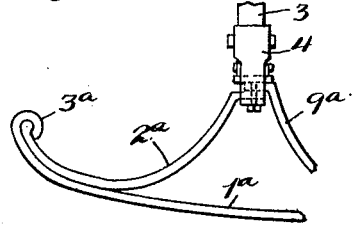
FIG. 5.  FIG. 4.
INVENTOR
Harry W. Dyer
BY
W. B. Morton
his ATTORNEY

UNITED STATES PATENT OFFICE.

HARRY W. DYER, OF EAST ORANGE, NEW JERSEY, ASSIGNOR TO RICHARD T. NEWTON, OF NEW YORK, N. Y.

AUTOMOBILE FENDER.

1,406,828.     Specification of Letters Patent.     Patented Feb. 14, 1922.

Application filed February 7, 1916. Serial No. 76,582.

*To all whom it may concern:*

Be it known that I, HARRY W. DYER, a citizen of the United States, and a resident of East Orange, county of Essex, and State of New Jersey, have invented new and useful Improvements in Automobile Fenders, of which the following is a specification.

This invention relates to fenders or bumpers for automobiles, and has for its object to provide an article of this class which may be made throughout of stamped metal parts and will therefore be of very low manufacturing cost.

A further object of the invention is to provide a fender which may be made of light, resilient metal, but which is so designed as to be amply strong to serve its intended purpose in a thoroughly satisfactory manner.

A further object of the invention is to provide a fender of this class which will "give" readily when encountering an obstacle at either side to thereby push such obstacle out of the way without injury, but which will present a strong guard at its middle portion to protect the radiator of the vehicle from damage upon collision with another vehicle.

A further object of the invention is to provide a fender which will resiliently cushion the force of collision when it first engages an obstacle, but after a predetermined extent of movement toward the vehicle will offer a greatly increased resistance to protect the vehicle against damage.

In the accompanying drawings I have illustrated a preferred construction of my improved fender, and in the said drawings Figure 1 is a plan view of the fender partly in section, showing it attached to the frame of an automobile;

Fig. 2 is a perspective view of the fender shown in Fig. 1; and

Figs. 3 and 4 are detail views of portions of the fender which will be later described.

Fig. 5 is a plan view of a portion of the fender showing a modified construction.

As shown in Figs. 1 and 2, the fender is constructed throughout of a strip or strips which are of uniform cross section throughout. The fender comprises a front part, here shown as formed of two pieces 1 curved to the common bow-shape and maintained at the desired distance in front of the vehicle by rearwardly curved end pieces 2. The piece 2 consists of an integral extension of the front part, which is looped back parallel with a portion of the curved end of the part 1 and then curved rearwardly to connect with the end of the frame member 3 of the vehicle.

The attaching device for connecting the fender to the vehicle comprises a fork 4 to embrace the end of the frame to which it is bolted as shown, and a front hanger or socket to receive the attached portions of the fender. The socket is positioned immediately in advance of the knuckle 5 at the end of the frame members to which the springs 6 of the vehicle are attached and between the metal of the fender and the end of the knuckle there is inserted a filler-piece 7 shown more particularly in Fig. 1, which is preferably of hard rubber or similar material, and shaped to fit the knuckle on its rear face and be clamped against the knuckle by the bolt 8 which is screwed through the socket and the attached portion of the fender.

The middle portion of the fender is directly connected to the attaching devices by means of braces 9. The part 9 may be an integral extension of the piece 2 as shown, or may be a separate piece rigidly held by the attaching device 4. The front ends of the braces 9 are connected to the middle of the fender by sleeve or clip 10 which embraces the meeting ends of the pieces 1. The ends of the braces and the ends of the pieces 1 are connected to the sleeve by bolts 11 projecting through slots 12 in the ends of the braces and rigidly attaching together the ends of the front pieces and the sleeve. A filler piece 13 may be inserted in the sleeve between the front pieces 1 and the braces 9, the filler pieces having holes to permit the passage of the bolts 11. The length and shape of the braces 9 are such that in the normal position of the fender their ends are separated by a distance equal to the length of the slots 12 whereby when the fender first engages an obstacle the braces may bend backward under the force of the collision, offering only the resistance of their inherent elasticity until their ends come together in the sleeve. The two braces then form together a spring truss, and further movement of the fender can only be effected by flattening the arch of the truss.

By reason of this middle bracing the metal of the fender may be made very light throughout and yet serve as a very efficient bumper. Yielding at the ends of the bumper is an advantage rather than otherwise, as it cushions the force of a blow against a pedestrian who may be struck, and frequently prevents knocking a person down who would be knocked down if struck by a rigid part of the vehicle, as well as severely hurt by the blow. The ends of the fender are positioned to come in contact with the tires of the vehicle upon excessive bending, and as they offer a broad surface of contact there is very little likelihood of damage either to the fender or to the wheel.

In Fig. 5 I have shown a modified form of fender in which the part $2^a$ is formed of separate strips from the main member $1^a$. As here shown, the end part $2^a$ is connected by a crimped joint $3^a$ with the end of the part $1^a$. Of course, any other suitable joint may be used if desired. Also, the part $2^a$ is not integral with the middle brace $9^a$ of the fender, the ends of the parts $2^a$ and $9^a$ being held by the attaching device 4 in overlapped relation against the filler piece 7. The several portions of the fender may obviously be otherwise divided, if desired, for instance, each part $2^a$ and $9^a$ may be made in one piece as the parts 2 and 9 but connected at their ends to a separate front bar.

I claim:

1. An automobile fender comprising a front piece of flat metal extending across the vehicle in advance thereof, supports for the ends of said piece comprising strips of resilient flat metal extending from the ends of the front piece to the adjacent ends of the vehicle frame, said strips being bowed with their convex faces toward the front, and a middle support for said front piece extending from the middle of the front piece to the said ends of the vehicle frame, said middle support being formed of two flat strips of resilient metal curved to bow-form through their length, said last mentioned strips being rigidly attached at one end to the ends of the vehicle frame and extending from the frame to the middle of the front piece with their convex face toward the front and a lost motion connection between the ends of said middle support strips and the front piece, the shape of the said middle support strips when not under tension being such that their forward ends tend to separate to the limit allowed by the lost motion connection whereby the shock of the impact against the fender will be resisted only by the inherent elasticity of the metal of the middle support strips, tending to preserve their original curve until the lost motion of their connection with the front piece is taken up.

2. An automobile bumper comprising an impact member, spring supporting arms for the opposite ends thereof, an arch-like support for the mid area of the impact member, and a bracket at each side of the automobile chassis engaging an end supporting arm for the impact member and a leg of the arch-like mid support.

3. An automobile bumper comprising a strap metal impact member, spring supporting arms for the opposite ends thereof, and a mid support for the impact member, said mid support comprising spring arms extending from the mid area of the impact member toward the car on curves bowed toward the impact member and having a lost motion connection with the latter.

4. An automobile bumper comprising a strap metal impact member, spring supporting arms for the opposite ends thereof, and a mid support for the impact member, said mid support comprising spring strut arms extending from the mid area of the impact member toward the chassis on curves bowed toward the impact member, and having a yielding connection with the mid area of the impact member to form a strut-like resistance to deflection following the initial deflection of the impact member.

5. An automobile bumper comprising an impact member, spring supporting arms for the opposite ends thereof, and a mid support comprising strut-like spring arms slidably connected to the mid area of the impact member to afford a yielding strut-like resistance after initial deflection of said impact member.

6. An automobile bumper comprising an impact member, spring supporting arms for the opposite ends of the same, said arms being bowed toward the impact member, reinforcing arms extending toward the mid area of the impact member on curves bowed toward the latter, in combination with a pair of supporting brackets, each adapted to engage and support one of said end and one of said mid supporting arms from the car.

7. An automobile bumper comprising an impact member, spring supporting arms for the opposite ends of the same, said arms being bowed toward the impact member, said spring supporting arms being independent of the impact member but secured thereto, reinforcing arms extending toward the area of the impact member on curves bowed toward the latter, in combination with a pair of supporting brackets, each adapted to engage and support one of said end and one of said mid supporting arms from the car.

8. An auotomobile bumper comprising an impact member, spring supporting arms for the opposite ends of the same, said arms being bowed toward the impact member, independent reinforcing arms extending toward the mid area of the impact member on curves bowed toward the latter, in combination with a pair of supporting brackets, each adapted to engage and support one of said end and one of said mid supporting arms from the car.

9. An automobile bumper comprising an impact member, a supporting arm for the end thereof, said supporting arm having an offset attaching end, a reinforcing arm extending toward the mid area of the bumper and having an offset attaching end, said attaching ends of the end and mid-supporting arms being superposed, together with a common support therefor.

10. An automobile bumper comprising an impact member, a supporting arm for the end thereof, said supporting arm having an offset attaching end, a reinforcing arm extending toward the mid area of the bumper and having an offset attaching end, said attaching ends of the end and mid-supporting arms being superposed, together with an attaching bracket to which said superposed ends are secured.

11. An automobile bumper comprising a transversely extending impact member, spring supporting arms for the end and mid areas thereof, said arms on each side of the bumper being bowed toward each other and toward the impact member, together with attaching portions for said arms, said attaching portions extending transversely of the car, and means for securing said attaching portions to the car.

12. An automobile bumper comprising a transversely extending impact member of strap metal, and a spring supporting arm for the end thereof, said spring supporting arm being formed of strap metal and having its outer end in folded engagement with the end of the impact bar, and being bowed toward the latter to afford a spring support.

13. An automobile bumper comprising a transversely extending impact member of strap metal, and a spring supporting arm for the end thereof, said spring supporting arm being formed of strap metal and having its outer end in folded engagement with the end of the impact bar, and being bowed toward the latter to afford a spring support, the opposite end of said supporting arm being extended transversely of the side bar of the chassis for attachment thereto.

14. An automobile bumper comprising a resilient impact structure extending transversely of the chassis, a supporting arm for the impact structure connected to the end thereof by a spring bend, and an attaching portion for said supporting arm, said attaching portion extending transversely of the chassis, together with means engaging said attaching portion to secure the bumper in position.

15. An automobile bumper comprising an impact bar extending transversely of the chassis and recurved to form an end supporting arm, said supporting arm having an attaching portion extending transversely of the chassis, together with bracket means engaging said attaching portion to secure the bumper in position.

16. An automobile bumper comprising an impact structure extending transversely of the chassis, a spring supporting arm for the impact structure having an attaching portion extending transversely to the chassis, together with an attaching bracket having members arranged on opposite sides of the chassis side bar and clamped to the latter, together with means for securing said attaching portion of the supporting arm to said bracket.

17. An automobile bumper comprising an impact structure extending transversely of the chassis, a supporting arm for the impact structure having an attaching portion extending transversely of the chassis, a bracket secured to the chassis side bar, and means for supporting said attaching portion of the arm to said bracket in position to transmit its thrusts to the end of the chassis side bar.

18. An automobile bumper comprising a transversely extending impact member, end supporting arms therefor, in combination with a mid support for said bumper, said mid support comprising a pair of spring arms extending from the mid area of the impact member toward the support, said mid area supporting arms having attaching ends extending transversely of the car.

19. An automobile bumper comprising an impact member of strap metal recurved at its opposite ends to form spring supporting arms, said end supporting arms having transversely extending attaching portions lying substantially in the plane of the impact member and arranged at a point substantially mid-way of the mid area of the impact member and its recurved ends.

Signed at New York city, in the county of New York and State of New York, this 5th day of February, 1916.

HARRY W. DYER.